Figure 1:
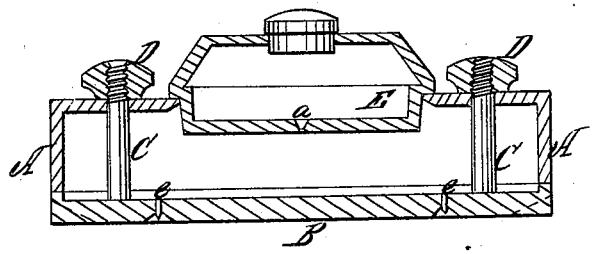
Figure 2:
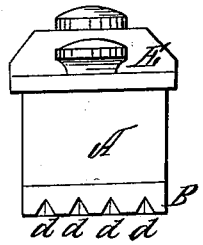
Figure 3:
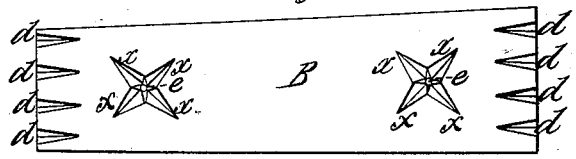

W. Weaver,
Scouring Marble.
Nº 70,656.   Patented Nov. 5, 1867.

Witnesses:
A. M. Marr
V. D. Lockbridge

United States Patent Office.

WILLIAM WEAVER, OF NASHUA, NEW HAMPSHIRE.

Letters Patent No. 70,656, dated November 5, 1867.

IMPROVED DEVICE FOR SCOURING MARBLE.

The Schedule referred to in these Letters Patent and making part of the same.

TO ALL WHOM IT MAY CONCERN:

Be it known that I, WILLIAM WEAVER, of Nashua, in the county of Hillsborough, and in the State of New Hampshire, have invented certain new and useful Improvements in Device for Smoothing and Scouring Marble; and I do hereby declare that the following is a full, clear, and exact description thereof, reference being had to the accompanying drawings, and to the letters of reference marked thereon.

In the annexed drawings, making part of this specification, A represents a metallic box, which is provided with a movable bottom, B. Bolts C C, whose heads are countersunk so as to be flush with the surface of the bottom B, pass through said bottom and through the top of the box, and are confined by means of the nuts D D. These bolts and nuts secure the bottom B to the box A. $e\ e$ represent small orifices or openings through the bottom B, connecting on the lower surface of the bottom with a series of radiating grooves, $x\ x$. $d\ d$ represent a series of tapering grooves in the ends of the bottom B. The top of the box A is provided with an opening, in which sits the bottom of a tank, E, a ledge upon said tank resting upon the top of the box, around the mouth of the opening. The tank E has an opening in its top, through which it is filled with water, and a small opening, $a$, in its bottom, through which water is allowed to escape. The box A is filled with prepared sand, and the tank E with water. The water escaping through the bottom of the tank E, carries the sand out through the openings $e\ e$ in the bottom B of the box, and the diverging angular channels $x\ x$ distribute both the sand and water on the surface of the stone or marble or slate that the machine may be working upon. One end of the box A (as also the bottom B) is made wider than the other, because much of the marble and stone used is of a tapering or obelisk form, and the workman is enabled to apply the wider and heavier end of this scourer to the wide end of the work, thus working most where most is needed.

Having thus fully described my invention, what I claim as new, and desire to secure by Letters Patent, is—

1. The box A, provided with a movable bottom, constructed substantially as and for the purpose set forth, and of any suitable material.

2. The use of a water-tank, E, in combination with the sand-box A, substantially as and for the purpose set forth.

3. Confining the bottom B to the box by means of bolts and nuts, said nuts being constructed so as to answer as handles for the scourer, substantially as represented.

In testimony that I claim the foregoing I have hereunto set my hand and seal this 15th day of May, 1867.

WILLIAM WEAVER. [L. S.]

Witnesses:
   A. McKEAN,
   GEO. E. WILDER.